(12) United States Patent
Ohtsu et al.

(10) Patent No.: US 7,292,416 B2
(45) Date of Patent: Nov. 6, 2007

(54) CPP MAGNETO RESISTIVE HEAD WITH DECREASED VARIATION IN ASYMMETRY AND OUTPUT

(75) Inventors: Takayoshi Ohtsu, Oi (JP); Satoshi Shigematsu, Yokohama (JP); Kouji Nishioka, Hiratsuka (JP); Takao Imagawa, Mito (JP); Kouji Kataoka, Odawara (JP); Masatoshi Arasawa, Odawara (JP); Norifumi Miyamoto, Chigasaki (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 71 days.

(21) Appl. No.: 11/372,302

(22) Filed: Mar. 8, 2006

(65) Prior Publication Data

US 2006/0152864 A1    Jul. 13, 2006

Related U.S. Application Data

(63) Continuation of application No. 10/660,865, filed on Sep. 11, 2003, now Pat. No. 7,031,123.

(30) Foreign Application Priority Data

Sep. 13, 2002 (JP) .............................. 2002-267552

(51) Int. Cl.
    *G11B 5/39* (2006.01)
(52) U.S. Cl. .................................. 360/324.12
(58) Field of Classification Search ........... 360/324.12, 360/324.2, 324.1, 324, 313, 110
    See application file for complete search history.

(56) References Cited

U.S. PATENT DOCUMENTS 5,408,377 A    4/1995    Gurney et al.

| 5,930,087 | A | 7/1999 | Brug et al. |
| 6,473,275 | B1 * | 10/2002 | Gill ............................ 360/314 |
| 6,538,859 | B1 | 3/2003 | Gill ....................... 360/324.12 |

(Continued)

FOREIGN PATENT DOCUMENTS

JP    11-053716    2/1999

(Continued)

OTHER PUBLICATIONS

Hasegawa et al. "Spin-Valve GMR Heads with Synthetic Ferrimagnet Free and Pinned Layers," Journal of the Magnetics Society of Japan 24:1239-1249 (2000).

(Continued)

*Primary Examiner*—Julie Anne Watko
(74) *Attorney, Agent, or Firm*—Townsend and Townsend and Crew LLP

(57) ABSTRACT

A magnetoresistive head comprises a free magnetic layer that has first and second free magnetic films sandwiching a non-magnetic intermediate film therebetween, the respective magnetizing directions of the first and the second free magnetic films are antiparallel. The length of the free magnetic layer in the direction of the track width is 200 nm or less, and a difference between a product of saturation magnetic flux density and a film thickness of the first free magnetic film, and that of the second free magnetic film is within a range from 1 to 3 nmT. By this structure, the variation of output and the variation of asymmetry is greatly decreased at a track width of 200 nm or less.

5 Claims, 16 Drawing Sheets

U.S. PATENT DOCUMENTS

| | | | |
|---|---|---|---|
| 6,721,144 B2 * | 4/2004 | Carey et al. | 360/324.11 |
| 6,764,778 B2 | 7/2004 | Saito et al. | |
| 6,807,034 B2 | 10/2004 | Hasegawa et al. | |
| 6,836,392 B2 * | 12/2004 | Carey et al. | 360/324.11 |
| 6,847,508 B2 | 1/2005 | Tanaka et al. | 360/324.12 |

FOREIGN PATENT DOCUMENTS

| | | |
|---|---|---|
| JP | 2000-113418 | 4/2000 |
| JP | 2000-137911 A | 5/2000 |

OTHER PUBLICATIONS

Nakamoto et al. "Read-Write Performance of GMR Heads with Lead Overlaid Structure," Journal of the Magnetics Society of Japan 24:367-370 (2000).

* cited by examiner

CPP MAGNETO RESISTIVE HEAD WITH DECREASED VARIATION IN ASYMMETRY AND OUTPUT

CROSS-REFERENCES TO RELATED APPLICATIONS

This application is a continuation of U.S. patent application Ser. No. 10/660,865, filed Sep. 11, 2003 now U.S. Pat. No. 7,031,123, which claims priority from Japanese application No. 2002-267552, filed Sep. 13, 2002, the disclosures of which are incorporated herein by reference.

BACKGROUND OF THE INVENTION

1. Field of the Invention

The present invention relates to a magnetic head, and more particularly, to a magnetic head and a recording apparatus that attains high-density recording.

2. Description of Related Art

As a result of increasing density of magnetic recording apparatus in recent years, GMR heads using a spin valve film having a magnetoresistive effect for a sensor film are used as a read head. These heads also use a permanent magnet layer abutted junction type for magnetic domain control. And thus, the narrowing of the read track width has been achieved. FIG. 2 shows a structure of a magnetic head of a permanent magnet layer abutted junction type of a prior art. In this structure, a GMR sensor film 1, permanent magnet layers 2 and electrode films 4 are interposed between two magnetic shields, namely, a lower magnetic shield S1 and an upper magnetic shield S2. The permanent magnet layers 2 are respectively located adjacent to the ends of the GMR sensor film 1, and the electrode films 4 are respectively located just above the permanent magnet layers 2. The permanent magnet layer 2 and the electrode film 4 have a role as the electrode for supplying current to the GMR film. The permanent magnet layer 2 has a role of magnetic domain control of providing a magnetic field to a free layer 30 constituting the GMR film 1, thereby forming a single magnetic domain. Since the magnetic field from the permanent magnet layer 2 is larger as it goes nearer to the permanent magnet layer 2, magnetizing rotation of the free layer is restricted by the magnetic field in the minute region of the GMR film near the permanent magnet layer to result in a region of low sensor sensitivity. The region is hereinafter referred to as "low sensitivity region". The sensitivity distribution of the sensor is shown in the figure in which skirt regions on both sides of the hill-like sensitivity distribution each represent the "low sensitivity region" 6. The low sensitivity region has a width of about 0.05 to 0.1 µm from the end of the permanent magnet layer. In a case where the read track width is as large as about 1 µm, the ratio of the low sensitivity region accounts for about 20% of the read track width, which causes no substantial problem. However, as the read track width is narrowed, the ratio of the low sensitivity region to the read track increases to abruptly decrease the read output.

FIG. 3 shows the dependence of the read output on the read track width in a case where the sense current is made constant at a constant MR height. As the track width decreases, the read output decreases abruptly relative to the proportional relation shown by a dotted line in the graph, and the output is reduced to zero at an effective track width of 0.15 µm in extrapolation. At a recording density of 70 Gb/in$^2$ or more, it is necessary that the effective read track width is 0.2 µm or less and, since about 1 mV of the read output is necessary for driving a hard disk drive normally, information written in a recording medium cannot be read by the conventional permanent magnet abutted junction type GMR head because the read output is excessively low.

In order to prevent abrupt lowering in the read output along with narrowing of the read track, an electrode overlap type GMR head has been proposed in the prior art.

FIG. 4 shows the structure of the electrode overlap type GMR head. A pair of permanent magnet layers 2 is provided each of which is adjacent to each side of a GMR sensor film 1 formed to a desired width. A pair of electrode films 4 provided each of which is disposed on each of the permanent magnet layers 2. Each of the electrode films 4 is configured to overlap the GMR film 1, in which the distance DLD between the pair of electrode films 4 is made smaller than the gap DCD between the pair of magnet domain control films 2. In this structure, since a region where current flows mainly in the GMR film is the region DLD between the pair of electrodes in the drawing, a region having the sensitivity of the sensor film is the DLD region in the drawing. Since the permanent magnets are positioned apart from the region sufficiently, it was expected that the lowering of the sensitivity would not be caused in the DLD region.

However, by examining the sensitivity distribution of the sensor closely, it has been found that the sensitivity of the sensor film is distributed more widely than the region denoted by DLD between the electrodes and the read track width is greater than the electrode distance DLD. Accordingly, in order to obtain a desired read track width, it has been found that the inter-electrode film distance DLD has to be less than a desired width. The reason why the read track width is wider than the DLD is that magnetic fluxes of a medium that entered the free layer just below the electrode propagates to the free layer in the DLD region. The propagated magnetic field causes the resistance in the GMR sensor film to change. One of the method for avoiding the problem is to narrow the inter-electrode film distance DLD in prospect of the widened read track width. However, since this needs a photolithographic process technique of preparing narrower inter-electrode film distance DLD, it leads to difficulty in view of the fabrication process.

On the other hand, one of the other ways for improving the sensitivity of the sensor is by lowering of the magnetic domain control force. However, this makes the magnetic domain control insufficient, due to variations in the amount of overlap or variations in the angle of the electrode 4 or the magnetic domain control film (permanent magnet layer 2) at the end of the sensor film and results in waveform instability.

As stated above, in the prior arts, it is a problem that an abrupt lowering of an output occurs, which results from narrowing of a read track, in using conventional permanent magnet abutted junction type. Also, attaining a read head having high read sensitivity and having a narrow read track width with less waveform instability. The problem caused by the narrowing of the track width applicable to high track density includes a problem with the narrowing of the magnetic track width, which particularly results in a significant problem with reading. This is because magnetization at the end of the geometrical track width is less moveable under the effect of the magnetic domain control field and a dead region with no sensitivity is present. That is, the ratio of the dead region increases as the track width is narrowed to make lowering of the read output conspicuous. This results in a particularly significant problem at a track width of 200 nm or less. Therefore, a magnetic head having a lead overlay structure or a magnetic film of high magnetoresistive effect has been known. In the lead overlaid structure, the electrode distance has to be narrower than the width of the free layer. Therefore, it is difficult to use for the narrow tracks, which the width is 200 nm or less, because it is difficult to form it by lithography, or because of the variation in track width due to the variations in the matching of the width of the free layer and the electrode distance.

On the other hand, larger resistance change has been studied by using a magnetic film of a high saturation magnetization such as a CoFe single layered film having a high magnetoresistive ratio. However, since larger magnetic domain control force is necessary as the saturation magnetization is larger, this is not actually so effective in the narrow track. That is, if the magnetic domain control is weakened, higher output can be obtained in accordance with the magnitude of the magnetoresistive ratio. However, weak magnetic domain control also results in increased magnetic instability. Accordingly, the magnetic domain control has to be enhanced. Further, a stacked ferrimagnetic structure for the free layer has also been studied, which is described in both U.S. Pat. No. 5,408,377 and Japanese published patent JPA 2000-113418. In the structure disclosed, the magnetizing direction of the free layer changes easily merely by applying an external magnetic field of low intensity, due to the reduced effective magnetic film thickness. This leads to enhanced sensitivity. However, the stacked ferrimagnetic free layer has to be kept anti-parallel, even when a vertical bias field or a lateral bias field is applied, because of the Joule heat by the sense current, or because of the high temperature of the surroundings. And if anti-parallel can not be kept, even partially, it results in a problem of leading to the disturbance of the track profile. Further, the anti-parallel coupling strength depends highly on the film thickness. The problem is that the thickness control is difficult.

Moreover, descriptions regarding the track width are not found in the above-identified prior arts, and they are merely based on the study of the magnetic film structure and the effect in the narrow track is not considered. Further, U.S. Pat. No. 5,408,377 only studies in an area of a track width of as wide as 400 nm as a result of calculation. However, the ratio of the dead region is small in this area and the problem of the dead region is not studied. That is, the relation between the behavior of magnetization at the track end and the dead region in the magnetic head of a narrow track width is not apparent in view of the studies made so far.

Accordingly, what is needed is a magnetic head that obtains stable retrieving output, which can be used for narrow tracks.

SUMMARY OF THE INVENTION

In a preferred embodiment, the invention provides a magnetic head capable of obtaining stable read output at a track width of 200 nm or less.

One of the alternative embodiments to increase a read output is improvement in the utilization factor. This results in improved sensitivity by reducing the non-uniformity of the magnetizing rotation within a track width.

Other aspects and advantages of the present invention will become apparent from the following detailed description, which, when taken in conjunction with the drawings, illustrate by way of example the principles of the invention.

DESCRIPTION OF ILLUSTRATIVE EMBODIMENTS

As shown in the figures for purposes of illustration and described in detail in this section, the invention is embodied in a novel magnetic head that can obtain a stable read output. The invention is also embodied in a disk drive having such a head.

Another alternative embodiment shows the way to obtain increased read output by improving the utilization factor. This results in improved sensitivity by reducing the non-uniformity of the magnetizing rotation within a track width. This could be attained by combination with a stacked ferrimagnetic structure of a free layer at a track width of 200 nm or less.

Figure 5:
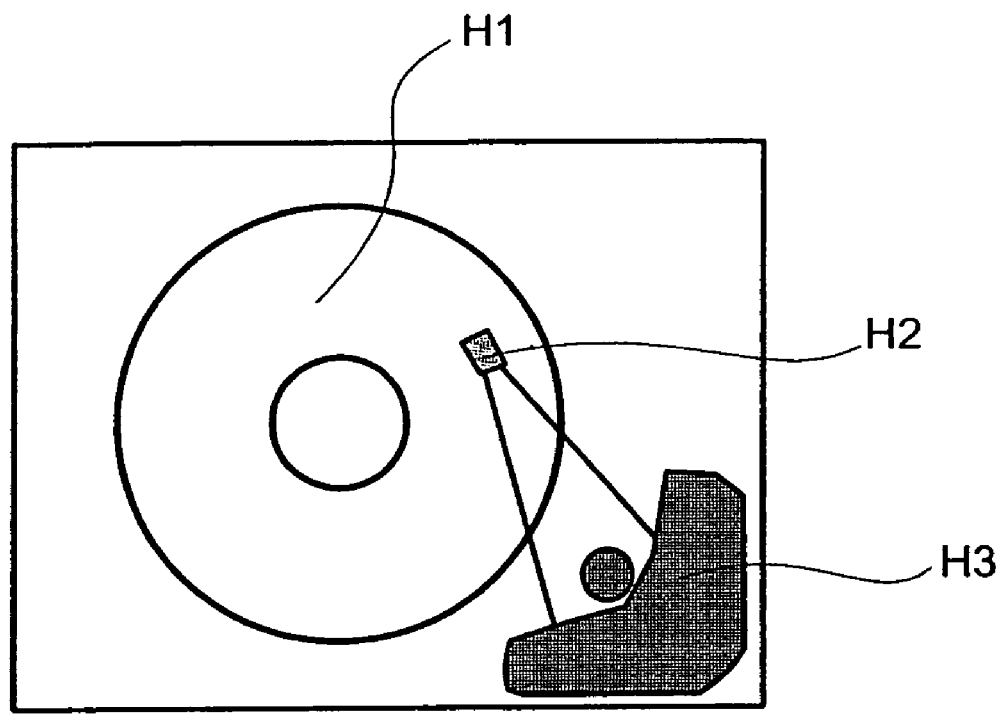
FIG. 5 is an explanatory view for a typical magnetic recording apparatus.

This embodiment is particularly useful as an information recording and reading system in which information is recorded as an arrangement of magnetic domains on a magnetic medium. The magnetic medium may be of any type including, for example, a magnetic tape, one or more hard disks, and one or more flexible disks. Magnetic domains are usually arranged along a track, and the constitution of the track includes circular, spiral and helical shapes, and an indefinite length shape. In a typical information recording and reading apparatus, a general-purpose computer receives input information by way of an input device having one or more interfaces from networks, keyboards, scanners or other equivalent facilities. The computer can be connected with one or more input devices and, in addition, can output information to one or more output devices. The output device may include, for example, networks, printers, display devices or modems connected with the computer by way of interfaces. In addition to other recording apparatus relevant to the computer, the computer writes information to magnetic recording apparatus as peripheral equipment or read information from magnetic recording apparatus. FIG. 5 shows a typical magnetic recording apparatus.

The magnetic recording apparatus has the following mechanisms:
(1) Recording medium H1: This has a disk-like shape in which signals are recorded in a concentrical manner.
(2) Magnetic head H2: This has an element for writing/reading of signals mounted on a floating type slider.
(3) Positioning mechanism H3: This is a mechanism for positioning a magnetic head on a medium. The head is usually moved in the radial direction of a disk by using a connection arm and a voice coil motor.

Figure 6:
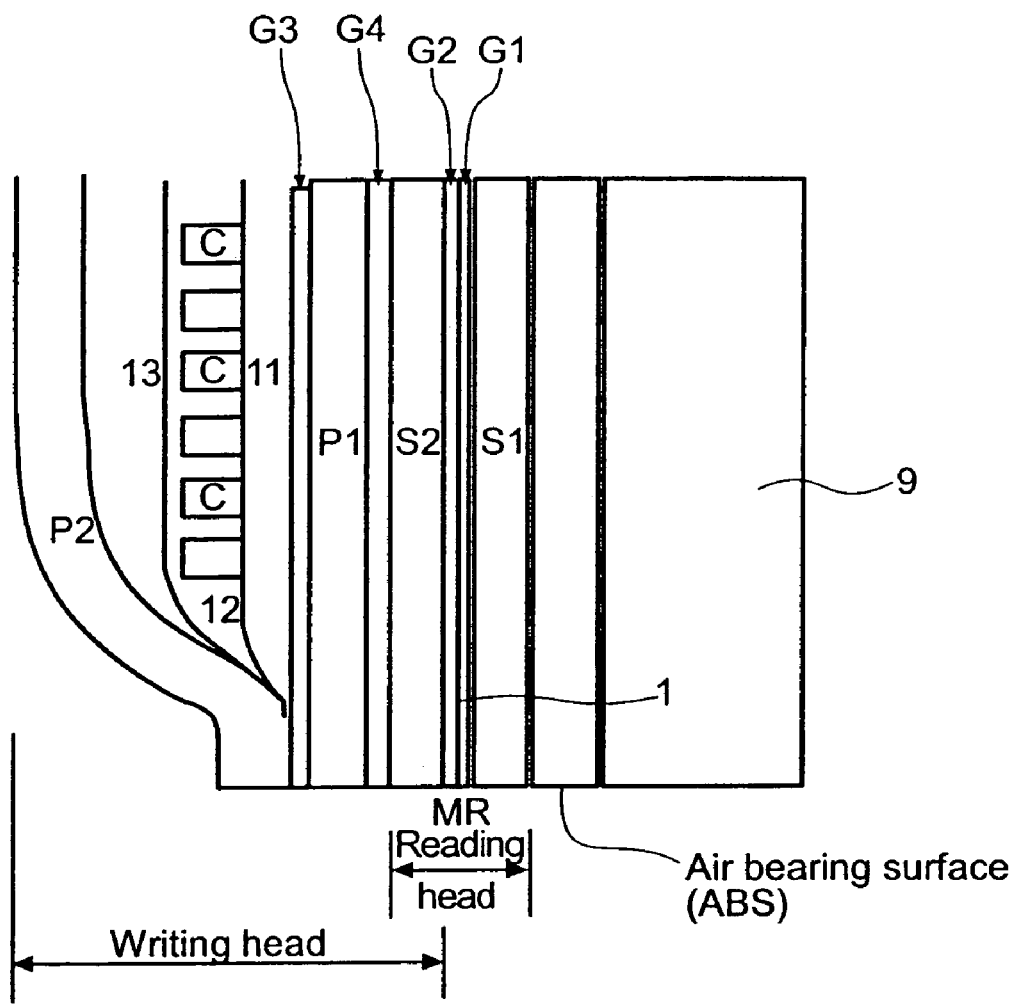
FIG. 6 is a cross sectional view of a recording medium and a magnetic head.

FIG. 6 shows a cross sectional view of a recording medium and a magnetic head. The head is subjected to lapping to form an air bearing surface (ABS). The ABS keeps a gap from the surface of a recording medium by air bearing. The reading head has a GMR sensor 1 put between an upper shield S1 and a lower shield S2. A writing head has a coil layer C and an insulating layer I2 which are put between insulating layers I1 and I3, and the insulating layers I1 and I3 are also put between a first pole piece P1 and a second pole peace P2. A third gap G3 is put between the respective top ends of the first pole piece P1 and the second pole piece P2 adjacent to the ABS to form a magnetic gap. During the write operation, a signal current is introduced through the coil layer C, and a magnetic flux leaks on the air bearing surface. The leaked magnetic flux is fed back by way of a soft magnetic film below the recording medium to the magnetic head. The magnetic flux causes circulatory tracks on the magnetic medium to be magnetized in the vertical direction during writing operation. During the read operation, the magnetized region of the rotating magnetic medium injects the magnetic flux to the GMR sensor of the reading head to cause a change in resistance inside the GMR sensor 1. The change in resistance is detected as a change in voltage of the GMR sensor. The usual magnetic disk drive having the GMR reading head, the magnetic head and the medium described above are for the sake of understanding the description of the present invention. Improvement in the invention resides in the adoption of the stacked ferrimagnetic structure for the free layer in order to increase the sensitivity at a track width of 200 nm or less.

Embodiment 1

Figures 1, 1A:
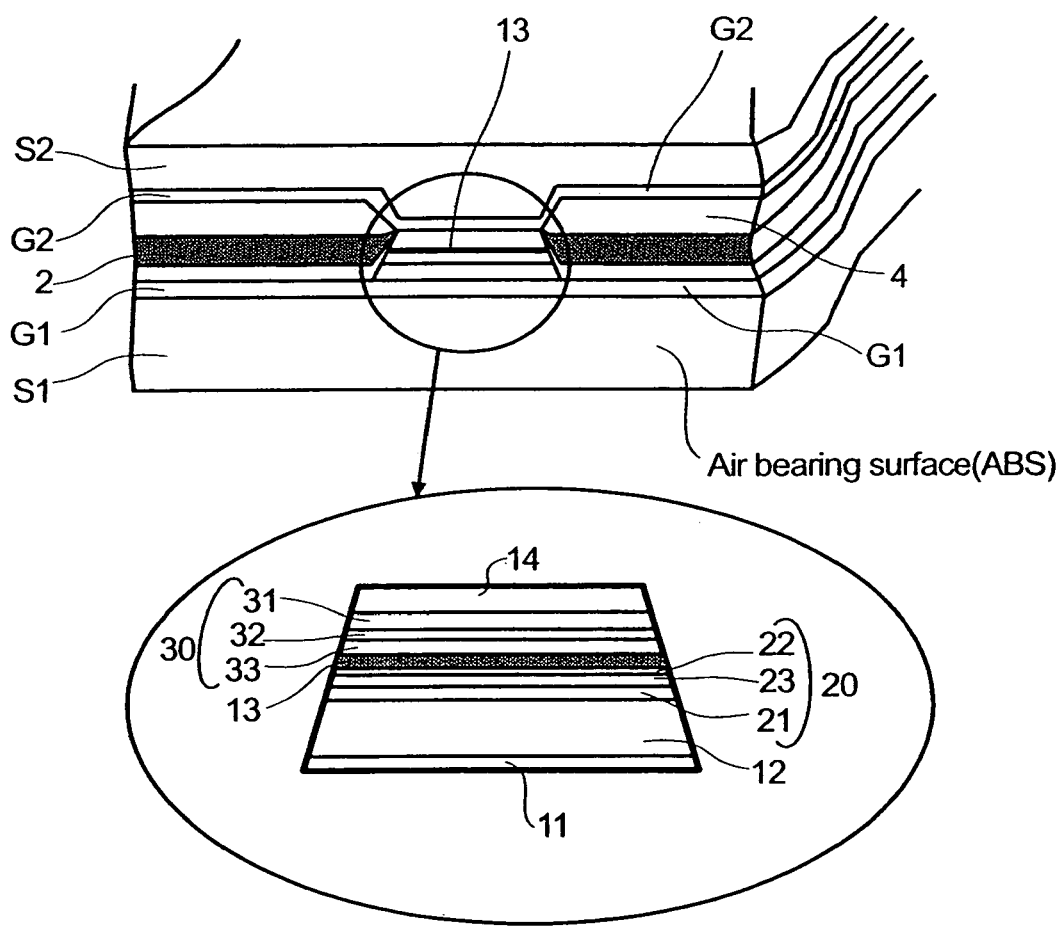
FIG. 1 shows a first embodiment of the invention with a close-up view shown in FIG. 1A.
Figure 2:
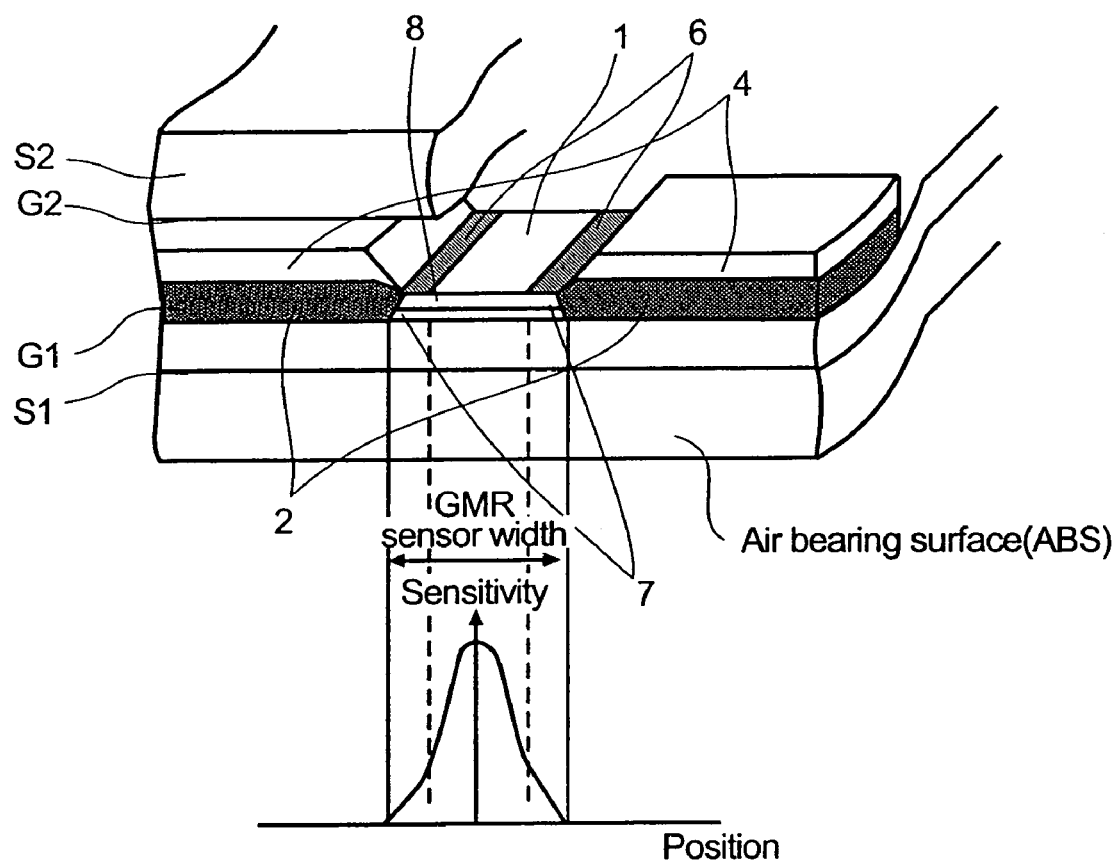
FIG. 2 shows a structure of an existent permanent magnet layer abutted junction type magnetic head.
Figure 3:
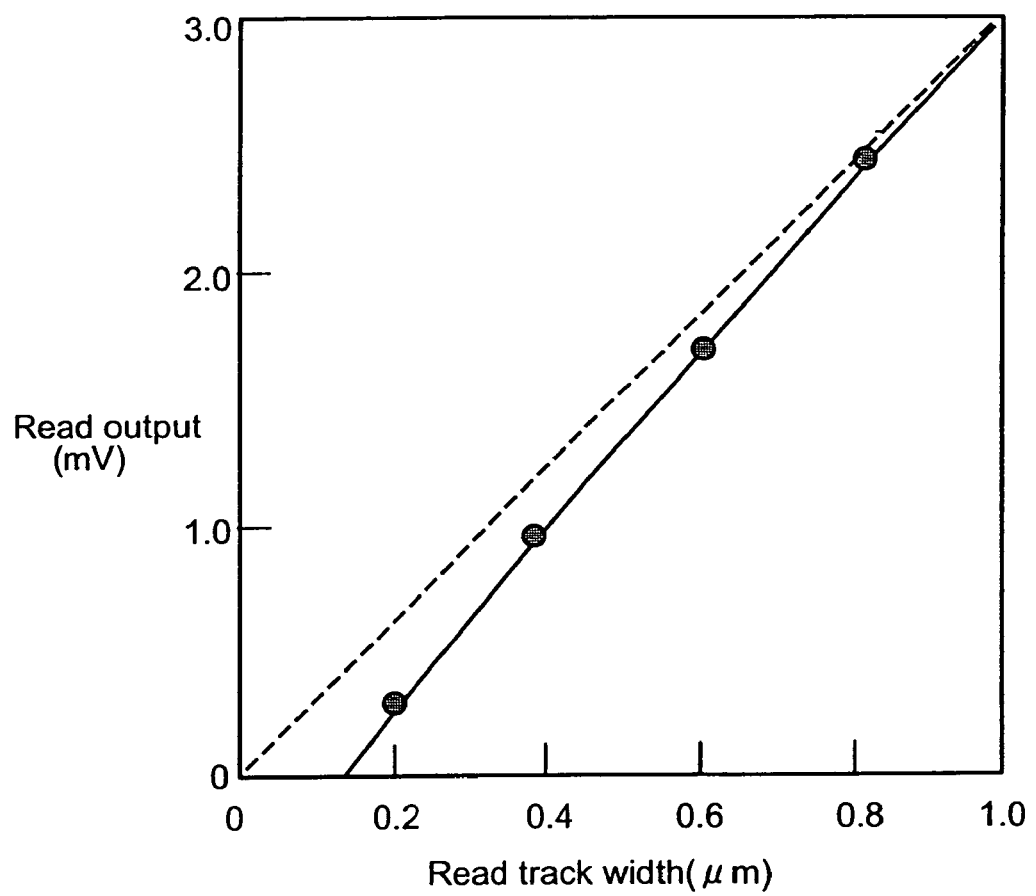
FIG. 3 is a graph showing the dependence of the read output on the read track width.
Figure 4:
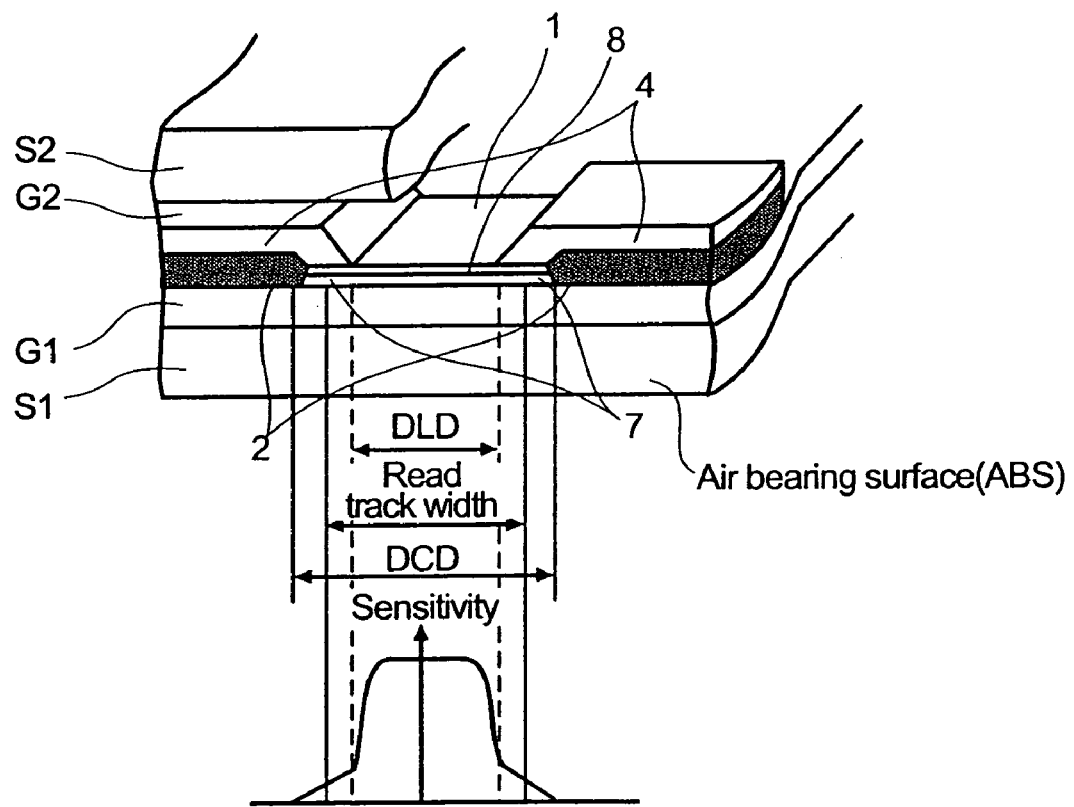
FIG. 4 shows the structure of another existent magnetic head.

FIG. 1 shows the first embodiment of the present invention with a close-up view shown in FIG. 1A. A lower gap layer G1 such as formed of $Al_2O_3$ is formed on a lower shield S1 such as formed of NiFe, an antiferromagnetic film 12 such as formed of PtMn is stacked on an underlying layer 11 such as formed of Ta, and a stacked ferrimagnetic pinned layer 20 comprising a stack of magnetic films 21, 22 such as formed of NiFe sandwiching Ru therebetween as an intermediate layer 23 is shown thereon as a pinned layer. A non-magnetic conduction layer 13 such as formed of Cu is stacked on the pinned magnetic layer 20 and a free layer 30 is formed on the non-magnetic conductive layer 13. The free layer is a stacked ferrimagnetic free layer 30 having a first magnetic layer 31 and a second magnetic layer 33 which sandwich a non-magnetic intermediate layer 32 such as formed of Ru therebetween and, further, a protective film 14 such as formed of Ta is stacked thereon.

The first magnetic layer 31 is formed of a ferromagnetic material and is formed, for example, of a NiFe alloy, Co, a CoNiFe alloy, CoFe alloy or CoNi alloy. Further, the non-magnetic intermediate layer 32 is formed of one of Ru, Rh, Ir, Cr, Re, Cu and the like, or an alloy thereof. The second magnetic layer 33 comprises a diffusion preventive layer and a ferromagnetic material, and the ferromagnetic material is formed of a NiFe alloy, Co, a CoNiFe alloy, CoFe alloy or CoNi alloy. Further, the diffusion preventive layer is also formed, for example, of a NiFe alloy, Co, a CoNiFe alloy, CoFe alloy or CoNi alloy. While not illustrated, a second free layer may be disposed as a free layer other than the free layer 30. Although not illustrated, a second free layer may be provided as a free layer other than the free layer 30. The second free layer may be formed of a single layer, or a stacked ferrimagnetic free layer in the same manner as the free layer 30.

An upper gap layer 12 comprising $Al_2O_3$ or the like is shown on the protective film 14, on which an upper shield S2 is provided.

Both sides of the stacked sensor films are removed by a lift off process to form a narrow track of 200 nm or less. A KrF stepper and KrF resist are used for the lift off process. Further, a process of electron beam lithography may also be used.

Figure 7A:
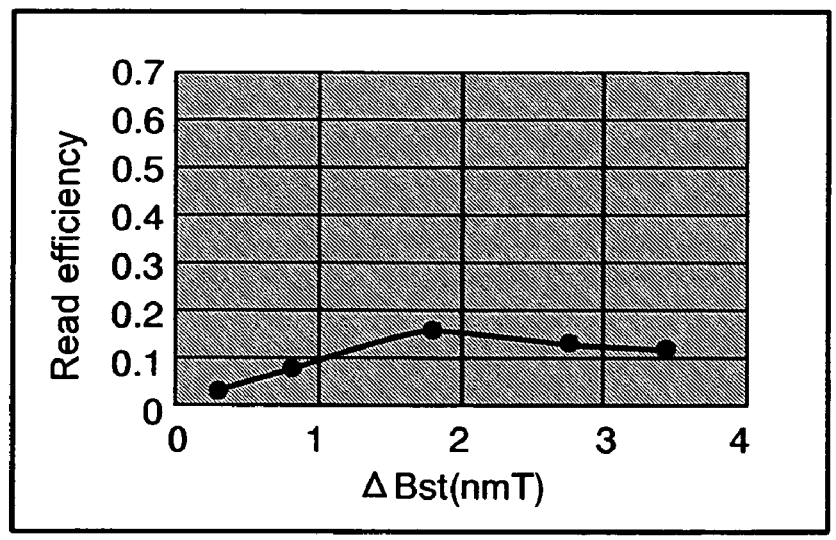
FIGS. 7A and 7B are graphs showing the calculations for the magnetized state of a GMR head.
Figure 7B:
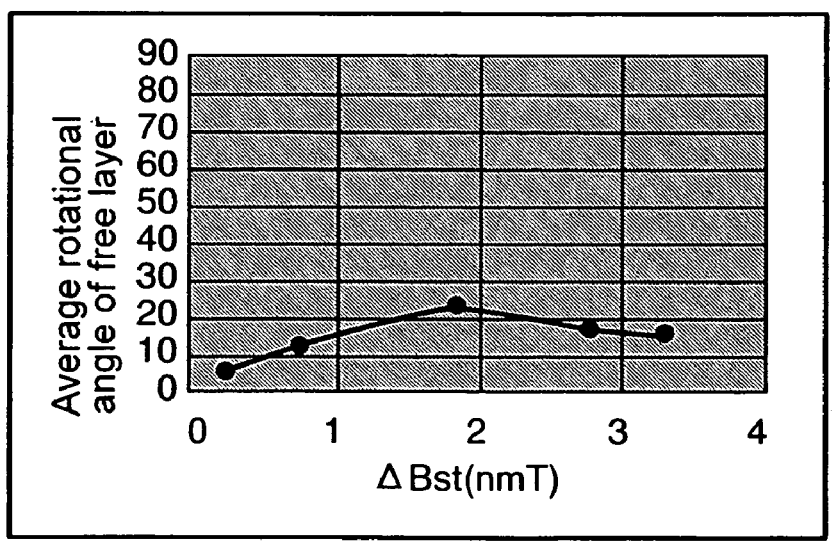

FIGS. 7A and 7B show calculations for the magnetization state of a GMR head according to a micro-magnetics model. The abscissa shows a difference ΔBst between the product of a saturation magnetic flux density Bst and a film thickness t of the first magnetic film 31 and that of the second magnetic film 33, and the ordinate shows reading efficiency in FIG. 7A. This is due to an increase in the average rotational angle of the free layer, as seen in FIG. 7B.

Figure 8A:
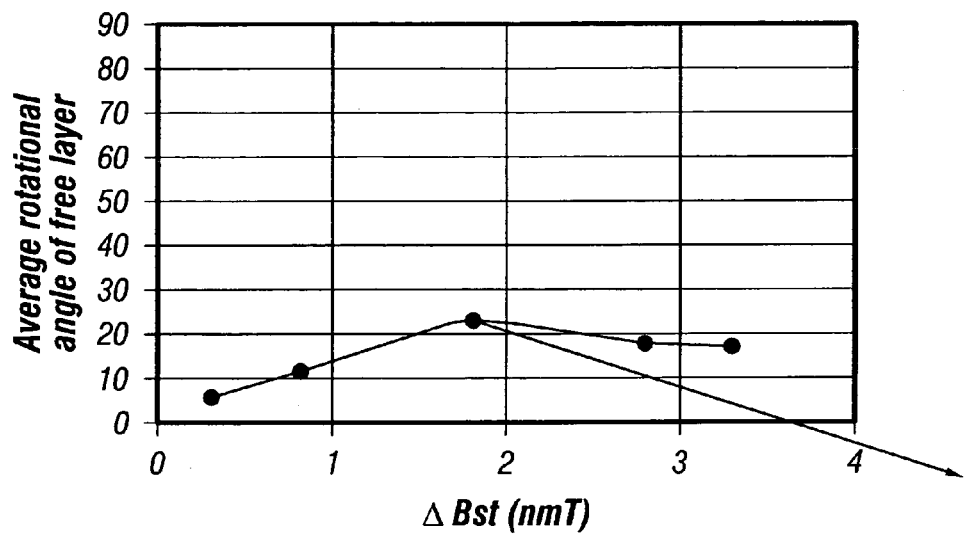
FIGS. 8A-8C are graphs showing the calculations for the magnetized state at $\Delta Bst$=about 2 nmT.
Figure 8B:
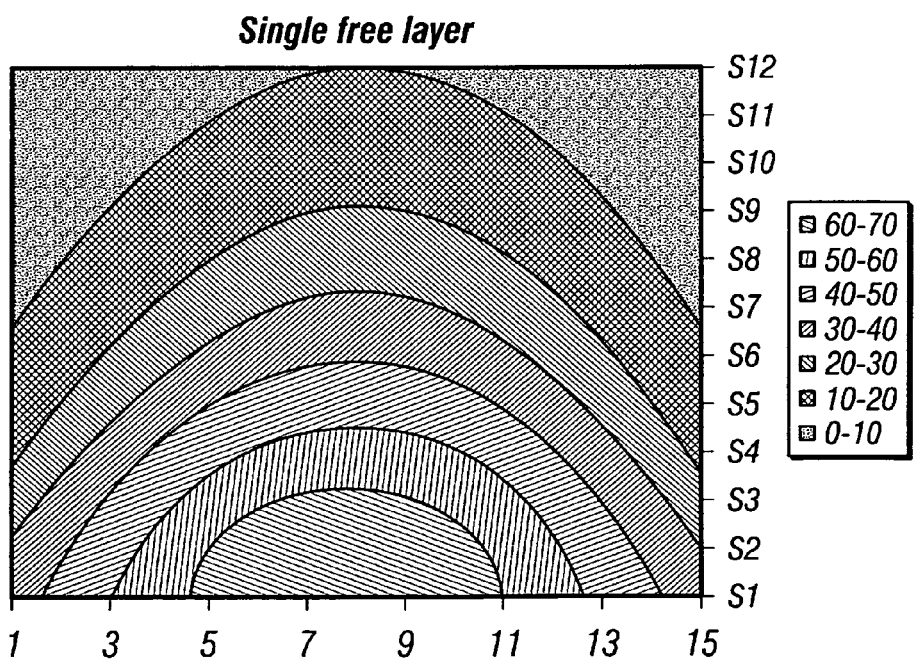
Figure 8C:
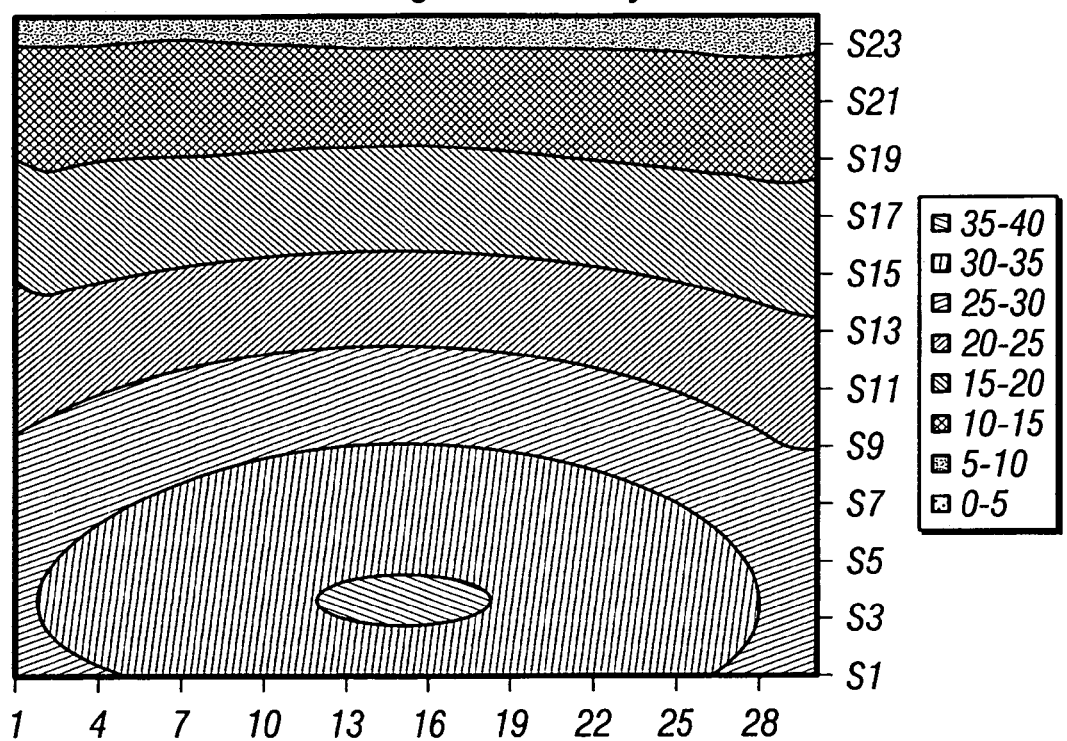

FIG. 8C shows a magnetization state at ΔBst=about 2 nmT. Further, for comparison, a magnetization state with the single layered film is also shown. This evidently shows that the single layered film (FIG. 8B) offers large magnetization at the central portion of the track, higher sensitivity at the central portion of thereof, and lower sensitivity at the ends thereof, whereas the stacked ferrimagnetic free layer 30 (FIG. 8C) offers improved sensitivity distribution within the track width, reduced non-uniformness of the magnetization rotation within the track width, and thereby improved sensitivity. FIG. 8A shows the average rotational angle of the free layer. According to our study, it is difficult to reduce the thickness of the single layered film for effectively exercising the magnetic domain control and about 4 nmT is required at the minimum for stably operating ΔBst (film thickness difference). On the other hand, in the stacked ferrimagnetic free layer 30, the magnetic domain can be controlled even at 1 nmT and magnetic instability such as fluctuation of the output is not caused. That is, smaller Bst can be attained by the stacked ferrimagnetic free layer. As apparent from the calculation, it can be seen that the maximum value is reached at 2 nmT. To satisfy 1 mV of output demanded by the apparatus, a reading efficiency of 10% or more is necessary. That is, it is made clear that the optimal ΔBst in the stacked ferrimagnetic free layer 30 is within a range from 1 to 3 nmT.

Figure 9:
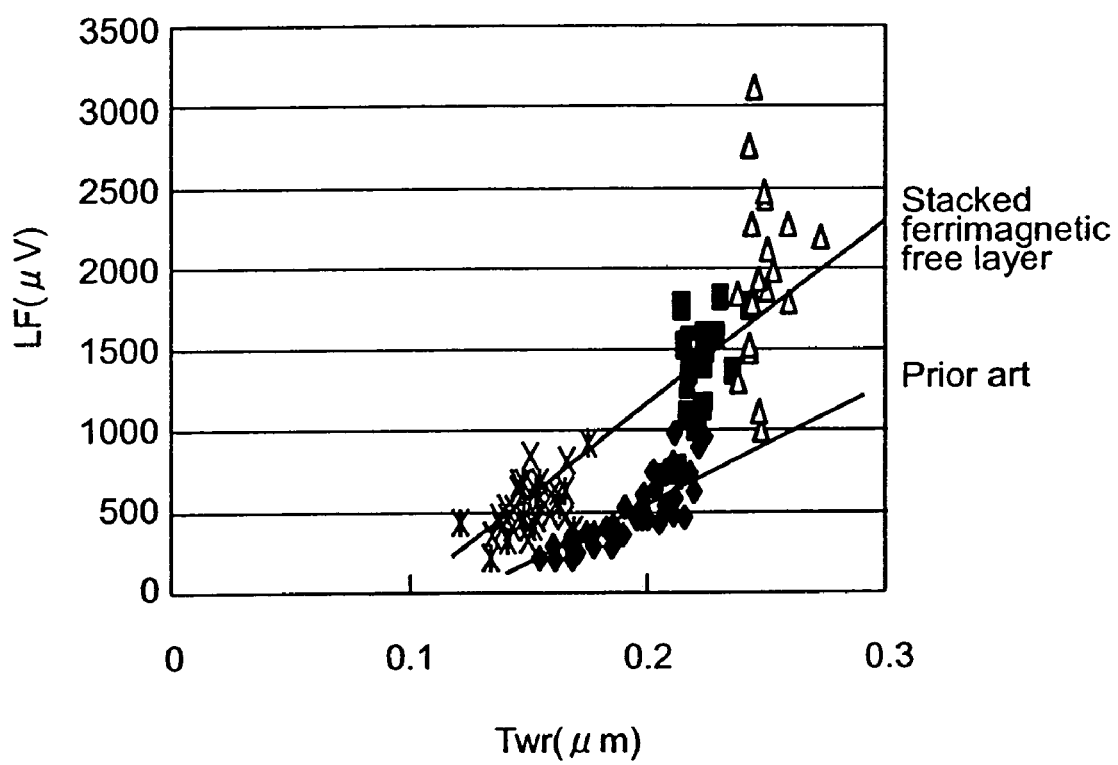
FIG. 9 is a graph showing the experimental result for the head produced trially.

FIG. 9 shows the result of trial production. The abscissa denotes a track width and the ordinate indicates an output. The output of the stacked ferrimagnetic free layer is increased by about 1.8 times that of the conventional free layer. Within a range of the track width of 200 nm or more used so far, the outputs vary greatly to result in a practical problem. However, in a region of 200 nm or less, the variations are improved greatly. This leads to a further remarkable result in the asymmetry.

Figure 10:
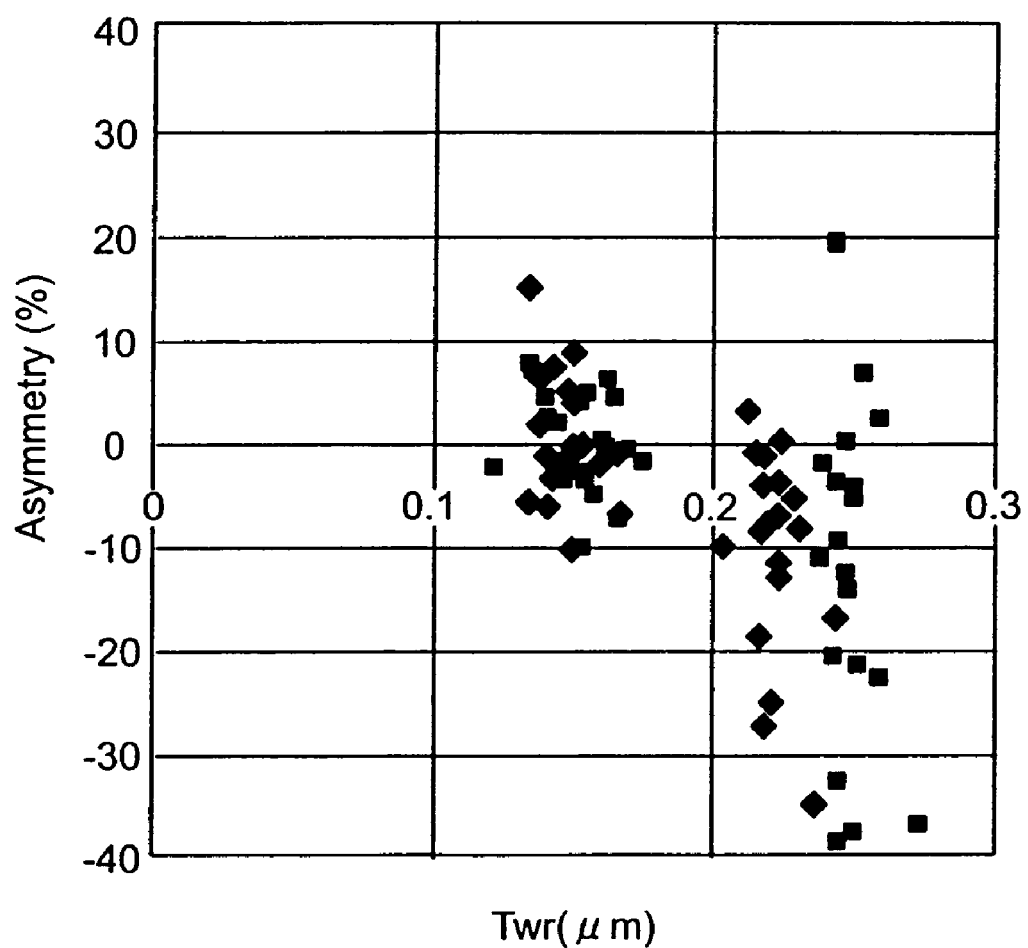
FIG. 10 is a graph showing the experimental result for the asymmetry.

FIG. 10 shows the result of asymmetry. A track width of 200 nm or more provides extremely large variations, which cannot reach a practical level. In contrast, it is apparent that the variations are improved remarkably in a region of 200 nm or less according to the result of this experiment. That is, it can be seen that variation in the bias state as the magnetized state is large in a case where the track width is wide (more than 200 nm). That is, it is apparent that the stacked ferrimagnetic free layer is not at a practical level in the existent process, and is not capable of preparing a track width of 200 nm or less. In contrast, it could have been found that the variation of output and the variation of asymmetry can be reduced greatly at 200 nm or less.

That is, it is apparent according to the invention that the method of improving the utility factor can be realized by the combination of the stacked free layer ferrimagnetic structure in the track width of 200 nm or less.

Embodiment 2

Figures 11, 11A:
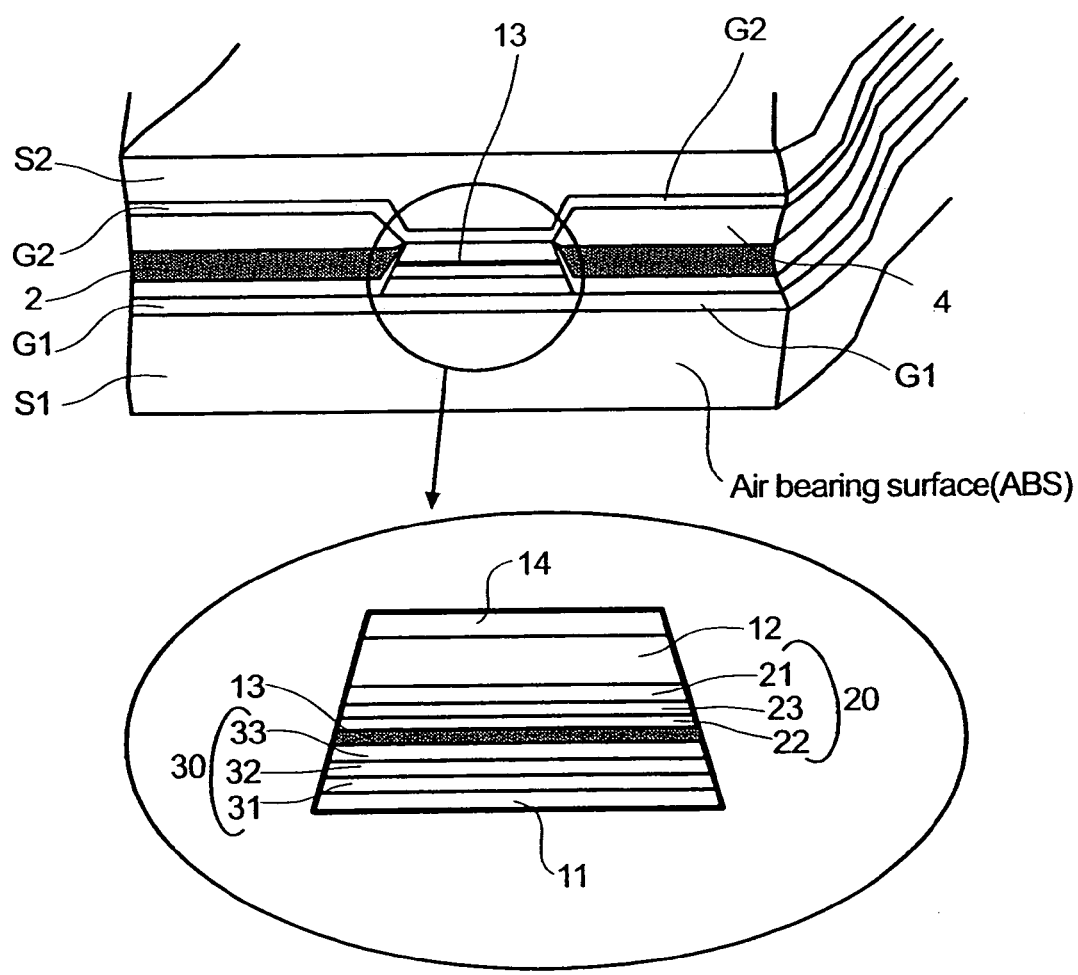
FIG. 11 is a cross sectional view showing a second embodiment of the invention with a close-up view shown in FIG. 11A.

FIG. 11 shows the second embodiment of the present invention with a close-up view shown in FIG. 11A. The first embodiment concerns the bottom spin valve structure, whereas the second embodiment concerns a top spin valve structure. A lower gap layer G1 such as formed of $Al_2O_3$ is formed on a lower shield S1 such as formed of NiFe, and a free layer 30 is formed on an underlying layer 11 such as formed of Ta. The free layer comprises a first magnetic layer 31 and a second magnetic layer 33 which sandwich therebetween a non-magnetic intermediate layer 32 such as formed of Ru. The first magnetic layer 31 is formed of a ferromagnetic material and formed, for example, of a NiFe alloy, Co, a CoNiFe alloy, CoFe alloy or CoNi alloy. Further, the non-magnetic intermediate layer is formed of one of Ru, Rh, Ir, Cr, Re or Cu or an alloy thereof. The second magnetic layer 33 comprises a diffusion preventive layer and a ferromagnetic material, and the ferromagnetic material comprises, for example, a NiFe alloy, Co, a CoNiFe alloy, CoFe alloy or CoNi alloy. Further, the diffusion preventive layer is also formed of a NiFe alloy, Co, a CoNiFe alloy, CoFe alloy or CoNi alloy. While not illustrated, a second free layer as a free layer other than the free layer 30 can be attained in the same manner as in the first embodiment.

A non-magnetic conductive layer 13 formed, for example, of Cu is stacked on a free layer 30, and a stacked ferrimagnetic pinned layer 20 comprising a stack of magnetic films 21, 22 such as formed of NiFe with Ru being sandwiched therebetween as an intermediate layer 23 is provided thereon. An antiferromagnetic film 12 such as formed of PtMn is stacked on the pinned layer on which a protective film 14 such as formed of Ta is further stacked. An upper gap layer 12 comprising, for example, $Al_2O_3$ is provided on the protective film, on which an upper shield S2 is provided further. Both sides of the stacked sensor films are removed by a lift off process to form a narrow track of 200 nm or less. A KrF stepper and a KrF resist are used in the lift off process. A process by electron beam lithography can also be used.

Embodiment 3

Figures 12, 12A:
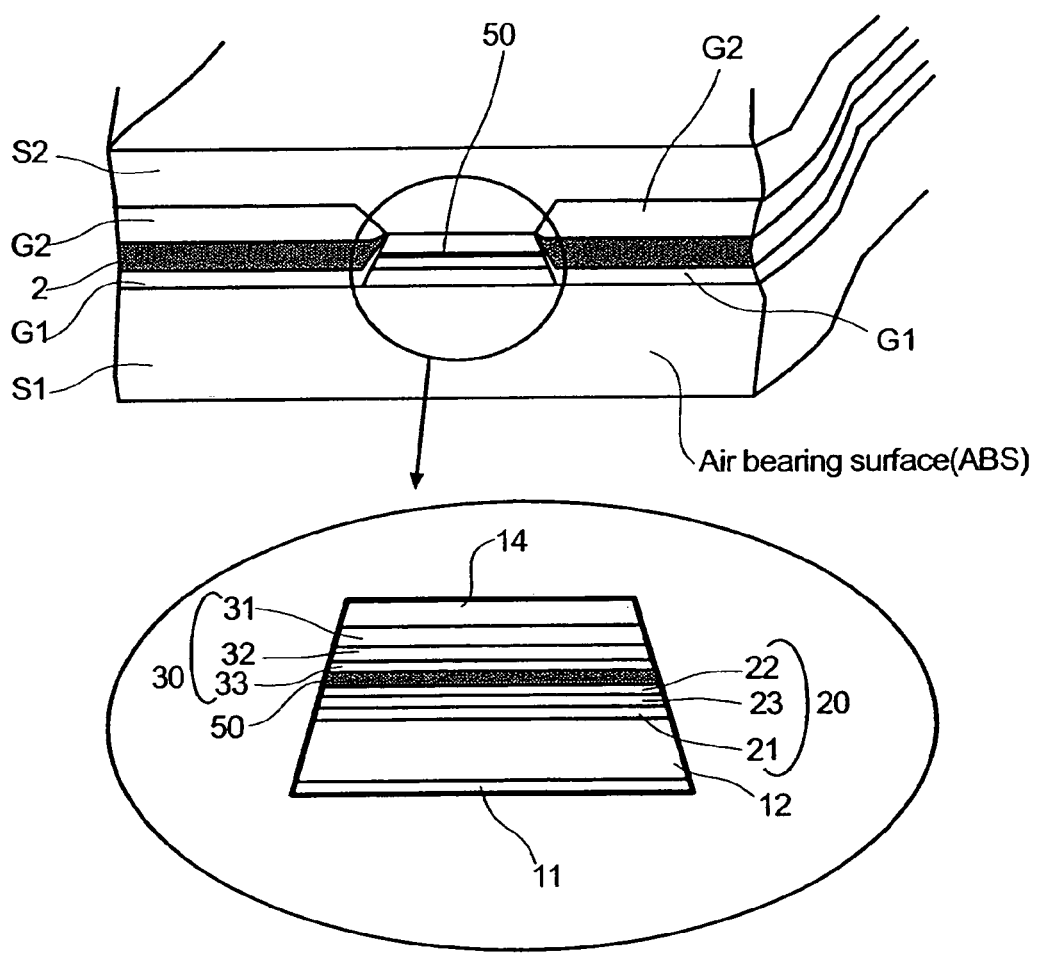
FIG. 12 is a cross sectional view showing a third embodiment of the invention with a close-up view shown in FIG. 12A.

FIG. 12 shows a third embodiment with a close-up view shown in FIG. 12A. While the spin valve type GMR head is shown in the first and second embodiments, a similar effect can be obtained also in a TMR head or CCP-GMR head. The third embodiment shows an example of a tunnel effect type magnetoresistive head.

On a lower magnetic shield S1 serving both as a lower shield and as a lower electrode, an underlying layer 11 formed, for example, of Ta and an antiferromagnetic film 12 such as formed of PtMn are stacked, and a stacked ferrimagnetic pinned layer 20 comprising a stack of magnetic films 21, 23 such as formed of NiFe sandwiching therebetween an intermediate layer 23 formed of Ru is provided further thereon as a pinned layer 20. An insulating layer 50 formed, for example, of $Al_2O_3$ is stacked on the pinned magnetic layer, and a free layer 30 is formed on the insulating layer. Change of the level of the tunnel current passing through the insulating layer depending on the magnetizing direction in the pinned layer and the free layer is utilized. The free layer 30 has a first magnetic layer 31 and a second magnetic layer 33 with a non-magnetic intermediate layer 32 such as formed of Ru being sandwiched therebetween, to constitute a stacked ferrimagnetic free layer 30 and a protective film 14 such as formed of Ru is stacked further thereon. As described above, a tunnel-effect type magnetoresistive head is constituted being sandwiched between an upper magnetic shield S2 serving both as the upper shield and as the upper electrode, and the lower magnetic shield S1.

The first magnetic layer 31 is formed of a ferromagnetic material and it is formed, for example, of an NiFe alloy, Co, a CoNiFe alloy, CoFe alloy or CoNi alloy. Further, the non-magnetic intermediate layer is formed of one of Ru, Rh, Ir, Cr, Re and Cu, or an alloy thereof. The second magnetic layer 33 comprises a diffusion preventive layer and a ferromagnetic material, and the ferromagnetic material is formed, for example, of a NiFe alloy, Co, a CoNiFe alloy, CoFe alloy or CoNi alloy. Further, the diffusion preventive layer is also formed, for example, of a NiFe alloy, Co, a CoNiFe alloy, CoFe alloy or CoNi alloy. Although not illustrated, a second free layer may be provided as a free layer other than the free layer 30. The second free layer may be formed of a single layer, or may be a stacked ferrimagnetic free layer like the free layer 30. An upper shield S1 serving also as the upper electrode is provided on the protective film.

Both sides of the stacked sensor films are removed by a lift off process to form a narrow track of 200 nm or less. A KrF stepper and a KrF resist are used in the lift off process. A process by electron beam lithography can also be used.

Embodiment 4

Figures 13, 13A:
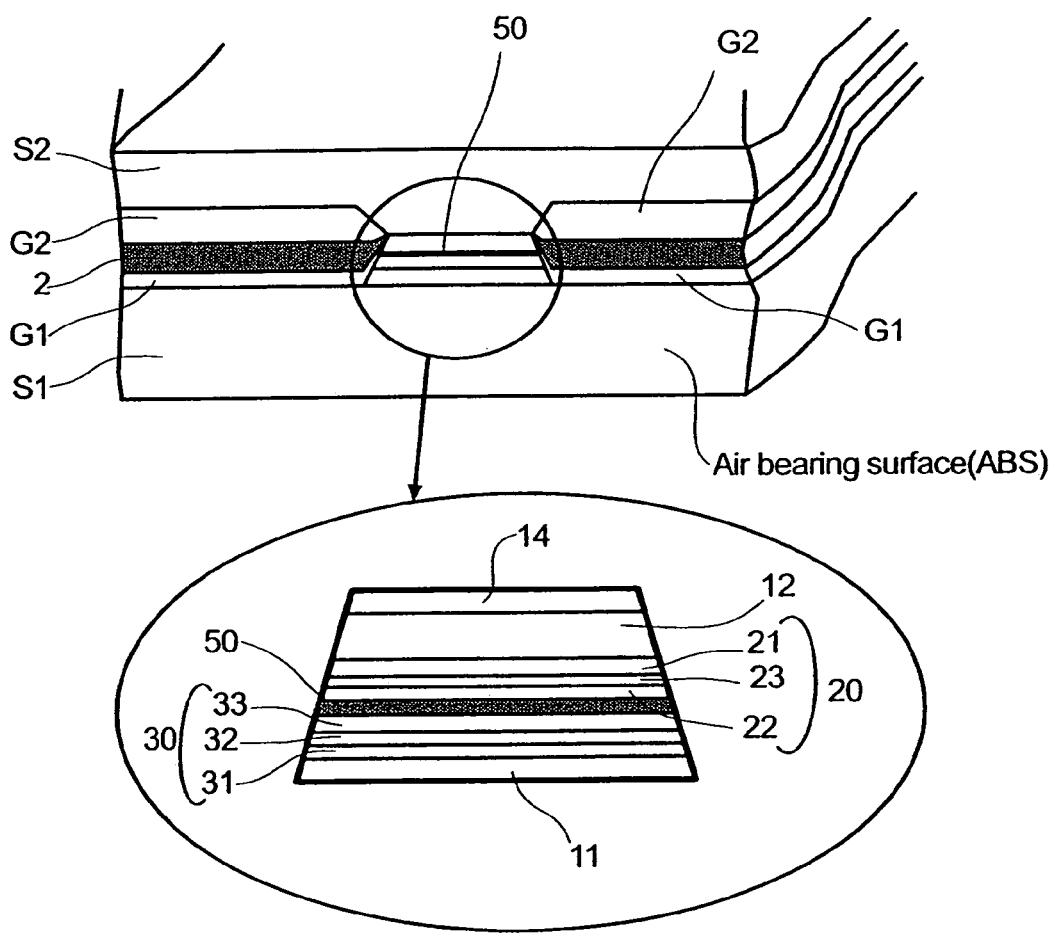
FIG. 13 is a cross sectional view showing a fourth embodiment of the invention with a close-up view shown in FIG. 13A.

FIG. 13 shows a fourth embodiment with a close-up view shown in FIG. 13A. While the third embodiment shows the TMR head of a bottom spin valve structure, the fourth embodiment shows a TMR head of a top spin valve structure. On a lower shield S1 serving also as a lower electrode formed, for example, of NiFe, an underlying layer 11 formed, for example, of Ta and a free layer 30 are formed. The free layer is a stacked ferrimagnetic free layer comprising a first magnetic layer 31 and a second magnetic layer 33 with a non-magnetic intermediate layer 32 such as formed of Ru being sandwiched therebetween. The first magnetic layer 31 is formed of a ferromagnetic material and it is formed, for example, of a NiFe alloy, Co, a CoNiFe alloy, a CoFe alloy or a CoNi alloy. Further, the non-magnetic intermediate layer is formed of one of Ru, Rh, Ir, Cr, Re and Cu, or an alloy thereof. The second magnetic layer 33 comprises a diffusion preventive layer and a ferromagnetic material and the ferromagnetic material is formed, for example, of a NiFe alloy, Co, a CoNiFe alloy, CoFe alloy or CoNi alloy. Further, the diffusion preventive layer is also formed, for example, of a NiFe alloy, Co, a CoNiFe alloy, CoFe alloy or CoNi alloy.

Although not illustrated, the second free layer as a free layer other than the free layer 30 can also be provided like the third embodiment.

An insulating layer 50 formed, for example, of $Al_2O_3$ is stacked on the free layer 30 and a pinned layer 20 is formed on the insulating layer. The change of the level of the tunnel current passing through the insulating layer depending on the magnetizing direction in the pinned layer and the free layer is utilized. An antiferromagnetic film 12 such as formed of PtMn is stacked on the pinned layer, and a protective film 14 such as formed of Ta is stacked further thereon. An upper shield S2 serving also as an electrode is provided on the protective film. Both sides of the stacked sensor films are removed by a lift off process to form a narrow track of 200 nm or less. A KrF stepper and a KrF resist are used for the lift off process. A process by electron beam lithography can also be used.

Embodiment 5

Figures 14, 14A:
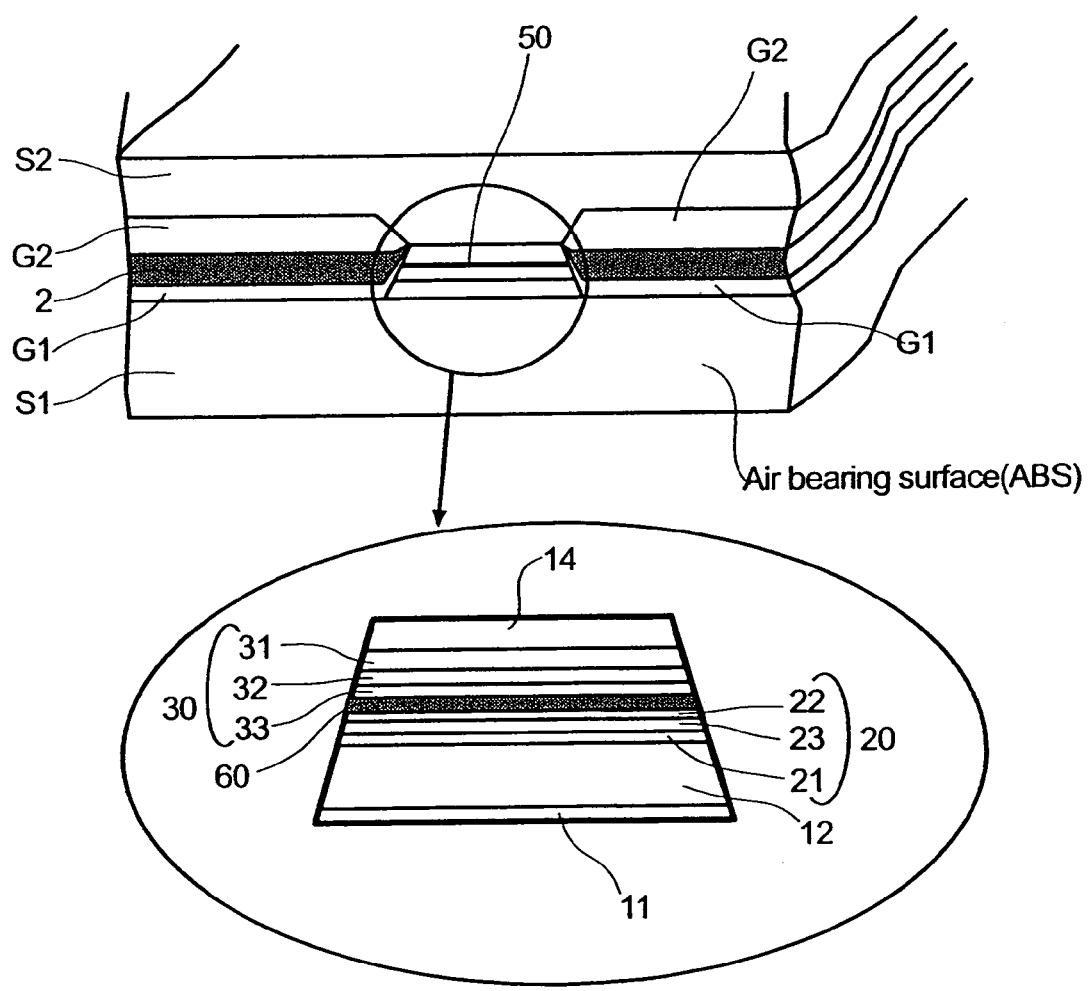
FIG. 14 is a cross sectional view for a fifth embodiment of the invention with a close-up view shown in FIG. 14A.

FIG. 14 shows the fifth embodiment with a close-up view shown in FIG. 14A. While descriptions have been made of the TMR head in the third and fourth embodiments but a similar effect can also be obtained in CCP (Current Perpendicular to Plane)-GMR.

The fifth embodiment shows an example of the CCP-GMR head. An underlying layer 11 such as formed of Ta and an antiferromagnetic film 12 such as formed of PtMn are stacked on a lower shied S1 also serving as a lower electrode, and a stacked ferrimagnetic pinned layer 20 comprising a stack of magnetic films 21, 22 such as formed of NiFe with an intermediate layer 23 formed of Ru sandwiched therebetween is provided thereon. A conductive layer 60 formed, for example, of NiFe is stacked on the pinned magnetic layer, and a free layer 30 is formed on the conductive layer. The free layer 30 comprises a first magnetic layer 31 and a second magnetic layer 33 sandwiching therebetween a non-magnetic intermediate layer 32 such as formed of Ru. Further, a protective film 14 such as formed of Ru is stacked thereon.

The first magnetic layer 31 is formed of a ferromagnetic material and it is formed, for example, of a NiFe alloy, Co, a CoNiFe alloy, CoFe alloy or CoNi alloy. Further, the non-magnetic intermediate layer is formed of one of Ru, Rh, Ir, Cr, Re and Cu, or an alloy thereof. The second magnetic layer 33 comprises a diffusion preventive layer and a ferromagnetic material, and the ferromagnetic material is formed, for example, of a NiFe alloy, Co, a CoNiFe alloy, CoFe alloy or CoNi alloy. Further, the diffusion preventive layer is also formed, for example, of an NiFe alloy, Co, CoNiFe alloy, CoFe alloy or CoNi alloy. Although not illustrated, a second free layer may also be provided as a free layer other than the free layer 30. The second free layer may be formed of a single layer, or it may be a stacked ferrimagnetic free layer like the free layer 30.

An upper shield S1 serving also as an upper electrode is provided on the protective film. Both sides of the stacked sensor films are removed by a lift off process to form a narrow track of 200 nm or less. A KrF stepper and a KrF resist are used in the lift off process. A process by electron beam lithography can also be used.

Embodiment 6

Figures 15, 15A:
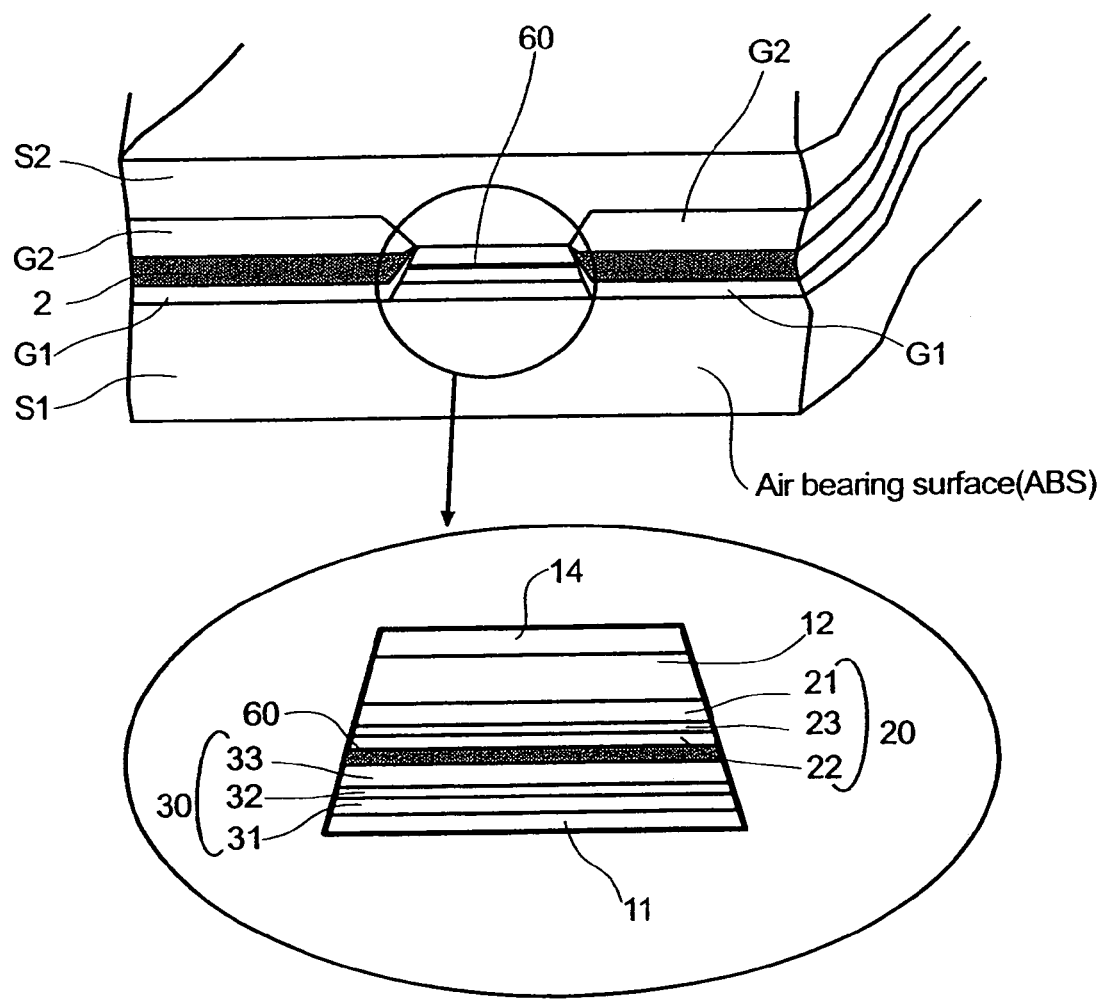
FIG. 15 is a cross sectional view showing a sixth embodiment of the invention with a close-up view shown in FIG. 15A.

FIG. 15 shows a sixth embodiment with a close-up view shown in FIG. 15A. The fifth embodiment shows the CCP-GMR head of the bottom spin valve structure, the sixth embodiment shows a CCP-GMR head of a top spin valve structure. On a lower shield S1 serving also as a lower electrode formed, for example, of NiFe, an underlying layer 11 formed, for example, of Ta and a free layer 30 are formed. The free layer comprises a first magnetic layer 31 and a second magnetic layer 33 with a non-magnetic intermediate layer 32 such as formed of Ru being sandwiched therebetween. The first magnetic layer 31 is formed of a ferromagnetic material and it is formed, for example, of a NiFe alloy, Co, a CoNiFe alloy, CoFe alloy or CoNi alloy. Further, the non-magnetic intermediate layer is formed of one of Ru, Rh, Ir, Cr, Re and Cu, or an alloy thereof. The second magnetic layer 33 comprises a diffusion preventive layer and a ferromagnetic material and the ferromagnetic material is formed, for example, of and a NiFe alloy, Co, a CoNiFe alloy, CoFe alloy or CoNi alloy. Further, the diffusion preventive layer is also formed, for example, of a NiFe alloy, Co, a CoNiFe alloy, CoFe alloy or CoNi alloy. The second free layer (not illustrated) can be provided like the fifth embodiment.

A conductive layer 60 formed, for example, of NiFe is stacked on the free layer 30 and a pinned layer 20 is formed on the conductive layer. An antiferromagnetic film 12 formed, for example, of PtMn is stacked on the pinned layer. A protective film 14 formed, for example, of Ta is stacked on the antiferromagnetic film 12. An upper shield S2 serving also as an electrode is provided on the protective film. Both sides of the stacked sensor films are removed by a lift off process to form a narrow track of 200 nm or less. A KrF stepper and a KrF resist are used for the lift off process. A process by electron beam lithography can also be used.

From the foregoing it will be appreciated that by implementing the embodiments of the present invention it is possible to reduce the variation of output greatly, and to reduce the variation of asymmetry of the magnetic head. Further, since a magnetic head with a narrow track width is provided, high track density can be attained and it is possible to provide a magnetic disk and a magnetic disk unit having high-density recording.

What is claimed is:

1. A magnetoresistive head comprising:
   a first electrode;
   a single spin valve structure formed on said first electrode; and
   a second electrode formed on said single spin valve structure,
   wherein said first and said second electrodes are provided for current to flow perpendicular to track width direction,
   wherein said spin valve structure includes an antiferromagnetic film, a pinned magnetic layer, a free magnetic layer, and a non-magnetic film,
   wherein said pinned magnetic layer is provided between said antiferromagnetic film and said non-magnetic film,
   wherein magnetizing direction of said pinned magnetic layer is pinned by an exchange coupling field with the antiferromagnetic film,
   wherein said non-magnetic film is provided between said pinned magnetic layer and said free magnetic layer,
   wherein the free magnetic layer has first and second free magnetic films sandwiching a non-magnetic intermediate film therebetween, the respective magnetizing directions of the first and the second free magnetic films are in antiparallelism, the length of the free magnetic layer in the direction of the track width is 200 nm or less, and a difference between a product of saturation magnetic flux density and a film thickness of the first free magnetic film and a product of saturation magnetic flux density and a film thickness of the second free magnetic film is within a range from 1 to 3 nmT.

2. A magnetoresistive head according to claim 1, wherein said non-magnetic film is an insulative film.

3. A magnetoresistive head according to claim 2, wherein said first and second free magnetic films are formed of CoFe alloy,
wherein said non-magnetic intermediate film is formed of Ru, and
wherein said insulative film comprises $Al_2O_3$.

4. A magnetoresistive head comprising:
a first electrode;
a single spin valve structure formed on said first electrode; and
a second electrode formed on said single spin valve structure,
wherein said first and said second electrodes are provided for current to flow perpendicular to track width direction,
wherein said spin valve structure includes an antiferromagnetic film, a pinned magnetic layer, a free magnetic layer, and a conductive film,
wherein said pinned magnetic layer is provided between said antiferromagnetic film and said conductive film,
wherein magnetizing direction of said pinned magnetic layer is pinned by an exchange coupling field with the antiferromagnetic film,
wherein said conductive film is provided between said pinned magnetic layer and said free magnetic layer,
wherein the free magnetic layer has first and second free magnetic films sandwiching a non-magnetic intermediate film therebetween, the respective magnetizing directions of the first and the second free magnetic films are in antiparallelism, the length of the free magnetic layer in the direction of the track width is 200 nm or less, and a difference between a product of saturation magnetic flux density and a film thickness of the first free magnetic film and a product of saturation magnetic flux density and a film thickness of the second free magnetic film is within a range from 1 to 3 nmT.

5. A magnetoresistive head according to claim 4, further comprising:
an underlayer which is provided between said first electrode and said antiferromagnetic film,
wherein said conductive film is formed from at least one of Ru, Rh, Jr. Cr, or Re,
wherein said first and second electrodes work as shields.

* * * * *